United States Patent

Sakurai et al.

[15] 3,647,340
[45] Mar. 7, 1972

[54] APPARATUS FOR MANUFACTURING BIAXIALLY ORIENTED FILM

[72] Inventors: Masao Sakurai, Yokohama; Kikuo Muto, Kawasaki, both of Japan

[73] Assignee: Gunze Kobunshi Kogyo Kabushiki Kaisha, Naka-gun Kanagawa Prefecture, Japan

[22] Filed: July 28, 1970

[21] Appl. No.: 58,963

[30] Foreign Application Priority Data

Aug. 16, 1969 Japan..................................44/64525
Aug. 30, 1969 Japan..................................44/68346

[52] U.S. Cl..............................................425/326, 264/95
[51] Int. Cl.................................................B29d 23/04
[58] Field of Search........................18/1 FB, 14 S, 14 R, 14 Q

[56] References Cited

UNITED STATES PATENTS

3,008,186  11/1961  Voigt......................................18/14 S
3,492,386  1/1970  Ohmasa et al.....................18/1 FB X

*Primary Examiner*—H. A. Kilby, Jr.
*Attorney*—Waters, Roditi, Schwartz & Nissen

[57] ABSTRACT

Apparatus for manufacturing a biaxially oriented film from a semifused thermoplastic material which is extruded in a continuous hollow tubular form from an annular discharge nozzle of an extruder machine of usual construction, wherein said thermoplastic material in a tubular form, or parison, is, after being preliminarily cooled, expanded in an air permeable heat-resistive enclosure which is generally shaped like an inverted funnel with its lower peripheral edge enlarged to an inside diameter corresponding to the outside diameter of the finally expanded tubular film. The tubular material is expanded with pressurized air or steam blown thereinto and, as the tubular material is expanded, it is cooled to a temperature ranging from the softening point to melting point of the thermoplastic material. The tubular film thus produced is then cooled and set as it is drawn and stretched in the longitudinal direction.

12 Claims, 6 Drawing Figures

APPARATUS FOR MANUFACTURING BIAXIALLY ORIENTED FILM

The present invention is concerned generally with an improvement in the method of manufacturing a film or film product of thermoplastic material and, more particularly, the invention relates to a novel and improved method of producing a biaxially oriented film or film product from a hollow, tubular form of extruded semifused thermoplastic material. The invention is also concerned with a apparatus specifically adapted to carry out the method of producing such biaxially oriented film or film product.

In order to manufacture a biaxially oriented film or film product from a thermoplastic material, it is necessary to have a semifused thermoplastic material stretched or elongated in two mutually crossing directions until the thus biaxially oriented micelles in the thermoplastic material are satisfactorily set. There are, in this instance, put into practice two typical methods of stretching or elongating the semifused thermoplastic material in two crossing directions. One of such prior art methods is, as is well known, to utilize a continuous hollow tubular form of semifused thermoplastic material which is extruded from an extruder machine of usual construction. The extruder machine has an extrusion head with a discharge nozzle which is formed annularly in cross section with predetermined geometry. A tubular form of thermoplastic material in semifused state is extruded through such annular nozzle of the extrusion head with given outside diameter and wall thickness. The tubular material so extruded through the annular nozzle is then expanded or inflated with air or hot steam blown thereinto under a regulated pressure, thereby being expanded peripherally. The tubular material thus being expanded is simultaneously stretched or elongated in an axial direction with the result that the micelles in the material are oriented in a biaxial fashion.

In order to maintain the semifused thermoplastic material in a satisfactorily fluid state while it is being expanded and stretched, the material should be kept heated at a certain elevated temperature. As a consequence, the micelles in the thermoplastic material are not sufficiently oriented even after the tubular material has been properly expanded and stretched in two directions. The film or film product manufactured in this manner is, therefore, still expandable when it is placed in use and is considered unacceptable for practical purposes.

The problem experienced in this particular prior art method can be solved if the other of the conventional methods is to be adopted. In this improved known method, a film of thermoplastic material extruded in the form a flat sheet is utilized. The flat thermoplastic film is stretched firstly in a certain direction and secondly in a direction crossing the first direction at a certain elevated temperature. The film of thermoplastic material thus being bidirectionally stretched and elongated in two successive stages, a wide selection of elongation ratio is obtainable so that the thermoplastic film can be oriented in a desired manner and to a desired extent. The resultant biaxially oriented film or film product manufactured in this manner, features a minimum of irregularity in flatness and thickness. In spite of such outstanding feature, this prior art method still has a drawback in that the production cost is disproportionately high because of the intricate production schemes required in the two-stage operation and that the yield of resultant products to the amount of starting material is significantly low, say, of the order of 60 percent because the peripheral edges of the resultant film must be discarded as useless after the stretching of the extruded film is completed. The thus increased production cost and low yield of production are apparently reflected by a sizable increase in the price of final products to be placed on a commercial market.

The present invention thus contemplates elimination of these and other drawbacks that have thus far been inherent in the prior art methods of manufacturing a thin biaxially oriented film or film product from a semifused thermoplastic material. The invention has been completed, after repeated research and experimental efforts made by the inventors, in recognition that a continuous tubular form of semifused thermoplastic material can be advantageously utilized as a starting material of such biaxially oriented film or film product because of the low production cost and high production yield attainable. The invention is, therefore, characterized in that, even though a usual tubular form of semifused thermoplastic material is invariably employed, the restriction conventionally encountered in the elongation ratio in the lateral direction of the tubular material being expanded in a highly fluid state can be overcome completely.

It is a primary object of the invention to provide an improved method of manufacturing a biaxially oriented film or film product from a continuous tubular form of semifused thermoplastic material from an annular discharge nozzle of an extrusion head of an extruder machine of usual construction.

It is another primary object of the invention to provide an improved method of manufacturing a biaxially oriented film or film product from a tubular semifused thermoplastic material with reduced production cost.

It is still another primary object of the invention to provide an improved method of manufacturing a biaxially oriented film or film product from a tubular thermoplastic material with increased production efficiency.

It is still another primary object of the invention to provide an improved method of manufacturing a biaxially oriented film or film product from a tubular thermoplastic material with uniform thickness and sufficient flatness.

It is still another primary object of the invention to provide an improved method of manufacturing a biaxially oriented film or film product from a thermoplastic material with an adequate order of elongation ratio in the lateral direction of the tubular material.

It is still another primary object of the invention to provide an improved method of manufacturing a biaxially oriented film or film product of thermoplastic material, which method is adapted to offer a wide selection of elongation ratios of the thermoplastic material.

It is still another primary object of the invention to provide an apparatus adapted to carry out the method of the invention, which apparatus is easy and simple to manufacture.

It is still another primary object of the invention to provide means for cooling the expanded tubular thermoplastic material so that the biaxially oriented micelles in the thermoplastic material are satisfactorily set when the resultant film is about to be discharged out of the apparatus.

In order to accomplish these objects, the invention proposes using a netting or porous enclosure shaped like an inverted funnel in which a tubular semifused thermoplastic material is expanded until it is entirely forced against the inner wall of the netting or porous enclosure. The tubular semifused thermoplastic material extruded from an annular nozzle of an extruder machine is immediately cooled with inert atmosphere such as air or steam to a temperature lower than the melting point and higher than the softening point of the material before it is introduced into the funnel shaped netting or porous enclosure located below the annular discharge nozzle of the extruder machine. The tubular material thus passed into the netting or porous enclosure is then expanded with air or hot steam blown thereinto under controlled pressure until the outer surface of the material is entirely in contact with the inner wall surface of the netting or porous enclosure. The netting or porous enclosure in this instance serves, among other things, to prevent the thermoplastic material from being deformed or dislocated undesirably and consequently to have the material uniformly oriented in two directions.

Thus, according to the invention, the semifused thermoplastic material extruded in a tubular form from an extruder machine can be expanded about two to six or even more times in diameter at a temperature lower than the melting point and higher than the softening point of the thermoplastic material used. This will mean that the expansion ratio attainable in the method manufacturing in the method according to the invention is 200 to 240 per cent higher than that attained in the conventional method using a semifused tubular material which is usually expanded about 1.0 to 2.5 times in diameter.

The film or film product manufactured in the method according to the invention, therefore, finds extensive useful applications, especially, for industrial packaging purposes because of its significantly increased resistance to elongation or mechanical stress.

Now, in a preferred process of carrying out the method according to the invention, a continuous tubular form of semifused thermoplastic material, which is usually called parison in the art, is extruded through an annular discharge nozzle of an extrusion head of an extruder machine. Since, the construction and operation of the extruder machine is well known to those skilled in the art, detailed description thereof is herein omitted. Immediately after the tubular material or parison is extruded downwardly from the annular nozzle, the parison is cooled with air or steam blown to the outer peripheral wall thereof so that the parison is maintained at a temperature lower than the melting point and higher than the softening point of the thermoplastic material used.

An enclosure which is generally shaped like an inverted funnel with its open ends reduced and enlarged is positioned immediately below and at a substantial spacing from the discharge nozzle of the extruder machine. The enclosure may be a netting with selected mesh or made of a suitable airpermeable porous unwoven cloth.

The parison extruded through the discharge nozzle in a tubular form is then introduced into the netting or porous enclosure and air or steam is blown into the parison thus depending from the discharge nozzle until the parison is fully expanded within the funnel-shaped netting or porous enclosure. The parison is, in this manner, uniformly and evenly stretched in its peripheral direction as it passes through the lowermost enlarged peripheral edge of the netting or porous enclosure. The thus laterally elongated parison is drawn and stretched downwardly away from the netting or porous enclosure with the result that the micelles in the thermoplastic material of the parison are evenly biaxially oriented.

It will be appreciated in this instance that the use of the funnel-shaped netting or porous enclosure contributes significantly to preventing the parison from being expanded into an irregular shape. As a matter of fact, it is sometimes experienced, where a tubular thermoplastic material is expanded in a usual manner, that is, without use of the netting or porous enclosure as proposed by this invention, that, when the tubular material extruded from the annular discharge nozzle is preliminarily cooled down and air or steam under pressure is blown into the tubular material so as to have the tubular material elongated in the peripheral direction, the tubular material tends to be expanded irregularly and unevenly and accordingly that the tubular material starts and terminates its expansion at indefinite instants. Thus, where the conventional method is to be followed to expand the tubular material, the resultant film fails to have uniform thickness and the micelles in the film are not oriented uniformly. According to an important feature of the method of the invention, in contrast, the tubular material can be expanded evenly and uniformly so that the micelles in the material are oriented regularly, through the provision of the netting or porous enclosure around the tubular material being expanded. Here, it is to be noted that, even though the tubular material or parison is extruded with irregular wall thickness, such irregularity can be remedied as the parison is expanded against the inner wall surface of the netting or porous enclosure with air or steam under constant pressure and at a constant temperature.

The use of the netting or porous enclosure, on the other hand, provides a pronounced advantage in maintaining the expanding parison at a proper temperature. Even though a local difference in temperature is present in the parison being expanded, the difference can be remedied as the parison is expanded with air or steam under constant pressure and at a constant temperature. As the parison is introduced into the netting or porous enclosure, moreover, air or steam is passed through the netting or porous enclosure to the outer peripheral wall of the parison, which consequently is cooled down uniformly. This will also serve to remedy the local difference in temperature in the expanding parison. Thus, according to another important feature of the method of the present invention, the parison which is being expanded in the netting or porous enclosure can be maintained at a temperature which is regulated to provide an optimum elongation of the parison and uniform thickness of the resultant film. It may be also mentioned in this instance that, as the parison is cooled down with the air or steam passed through the netting or porous enclosure, the parison loses its viscosity to a certain extent and is, as a result, permitted to smoothly slide down the inner wall surface of the netting or porous enclosure.

If it is desired to have the parison expanded at a greater ratio, the diameter of the lowermost edge of the netting or porous enclosure may be enlarged and the wall thickness of the parison and the amount and pressure of the air or steam to be used as a cooling medium may be increased proportionally to the increase in the lowermost diameter of the netting or porous enclosure.

The thermoplastic material to be used in the method according to the invention may be any polymer of thermoplastic nature but the same may preferably be polystyrene, polyethylene, polyvinyl chloride, or copolymer of polyethylene and vinyl acetate. Of these, polystyrene, in particular, is found by the experiments conducted by the inventors to exhibit the most outstanding quality of orientation when used in the method according to the present invention, as will be appreciated from the Examples of the invention which are to be described later.

Polystyrene is known to be solidified extremely rapidly from the fused phase and has a small melt viscosity and is therefore considered by those in the art as unsuitable for orientation purposes because the parison of polystyrene must be expanded in its fluid state. Such evaluation of polystyrene is completely upset by the improvement according to the invention.

The netting or porous enclosure to be employed to carry out the method of the present invention may be made of airpermeable heat-resistive braided or porous unwoven cloth and generally shaped like an inverted funnel with its upper open end reduced to admit passage of the parison and its lower open end enlarged to provide a predetermined elongation ratio. The netting or porous enclosure, however, may be preferably made of glass fibers, rock wool or yarns of hemp or cotton braided into a netting with selected mesh of the order of 5 to 100. For the purpose of manufacturing a biaxially oriented film of greater thickness, the mesh of the netting or porosity of the enclosure may be increased accordingly.

The film thus oriented biaxially as it leaves the netting or porous enclosure is then cooled down until it is completely set or cured. The film may be cooled either naturally or positively with a certain cooling medium applied thereto.

If it is desired to have the oriented film cooled down positively, the cooling medium (which may actually be cooled air or water) may be applied to the inner wall surface of the film leaving the lowermost enlarged peripheral edge of the netting or porous enclosure. The cooling medium thus introduced into the film serves not only to cool down the film but, where steam is blown into the parison to expand it, to convert the steam into condensed water thereby to adjust the temperature and pressure of the parison being expanded. The condensed water produced in this manner may be utilized as a "lubricant" between the inner wall surface of the film and outer wall surface of the cooling means so as to smoothly guide the set film outwardly.

The features and advantages of the method according to the present invention will become more apparent from the following description taken in conjunction with the accompanying drawings which illustrate preferred embodiments of an apparatus adapted to carry out the method of the invention. In the drawings.

Figure 1:
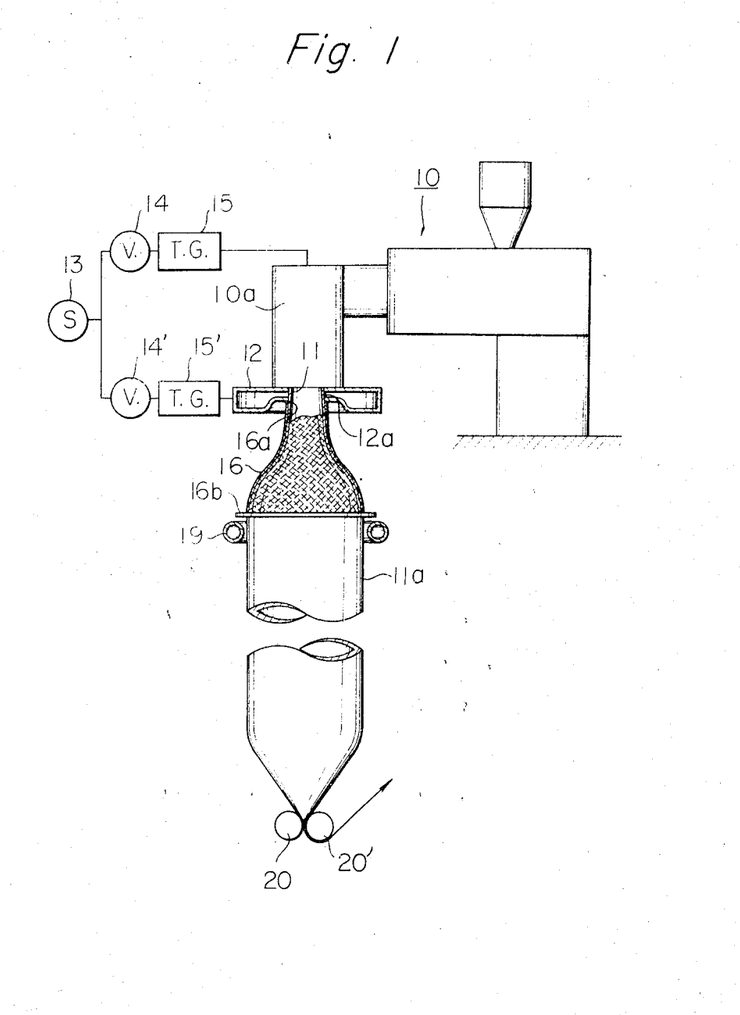
FIG. 1 is a schematic view showing an overall construction arrangement of a preferred example of apparatus adapted to carry out the method according to the invention.
Figure 2:
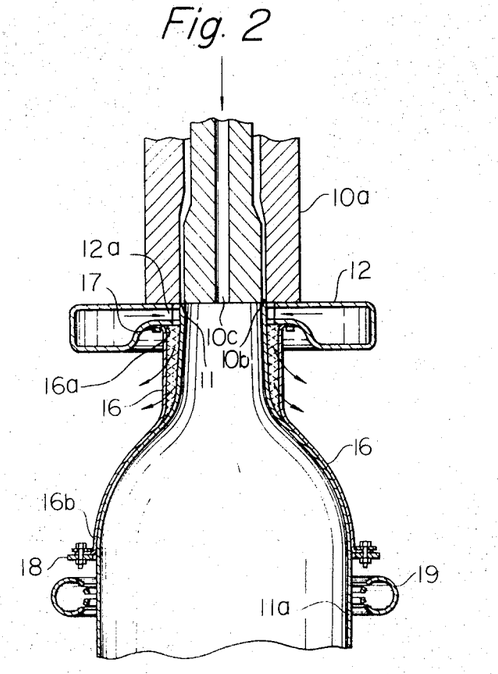
FIG. 2 is a vertical sectional view showing, on an enlarged scale, the parison being extruded and expanded.

Now referring to FIGS. 1 and 2, the apparatus to carry out the method according to the invention is used in combination with an extruder machine which is generally represented by reference numeral 10. The construction arrangements and mode of operation of the extruder machine are well known to those skilled in the art and, as such, the detailed description and illustration thereof are herein omitted. Suffice, it to say, however that the extruder machine 10 has an extrusion head 10a having an annular discharge nozzle 10b, through which a parison or continuous tubular material 11 of semifused thermoplastic with predetermined outside diameter and wall thickness is extruded downwardly at a fixed rate. An air supply tubing 12 is opened at its annular outlet 12a in the neighborhood of the discharge nozzle 10b in a manner to surround the outer peripheral wall of the parison 11 leaving the discharge nozzle 10b. The air supply tubing 12 communicates with a source 13 of air under pressure through a pressure control valve 14 and temperature gauge 15 and supplies to the outer peripheral wall of the parison 11 air under controlled pressure and at a regulated temperature. The temperature of the pressurized air to be applied to the parison 11 is regulated by the temperature gauge 15 in a manner to maintain the parison 11 at a temperature lower than the melting point and higher than the softening point of the thermoplastic material of the parison.

Figure 3:
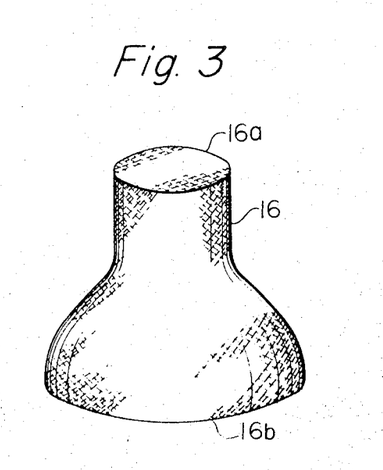
FIG. 3 is a perspective view showing, also on an enlarged scale, the netting or porous enclosure used in the method according to the invention.

The parison 11 thus cooled as it leaves the discharge nozzle 10b is then introduced into a netting 16, which is positioned immediately below and at a substantial spacing from the discharge nozzle 10b, as shown. The netting 16 is shaped generally like an inverted funnel and has its upper open end 16a reduced to admit passage of the parison 11 therethrough and its lower open end 16b enlarged with a diameter determined to provide a desired elongation ratio of the parison 11, as best seen in FIG. 3.

At the center of the annular discharge nozzle 10b is opened an air vent 10c communicating with the source 13 of pressurized air through a pressure control valve 14' and temperature gauge 15'. Thus, a stream of pressurized air is introduced into the parison 11 through the air vent 10c so that the parison 11 is inflated and expanded until it is entirely forced against the inner wall surface of the netting 16. In this instance, the pressure and temperature of the air to be passed through the air vent 10c may also be regulated by means of the pressure control valve 14' and temperature gauge 15', respectively.

The netting 16 may be secured in position preferably with its upper peripheral edge 16a mounted on an annular link 17 fixed to the lower wall of the air supply tubing 12 and its lower edge 16b mounted on an annular link 18 surrounding the lower enlarged portion of the parison, as seen in FIG. 2.

The stream of air gushing from the annular outlet 12a of the air supply tubing 12 is applied to the outer peripheral wall of the parison 11 through the mesh in the netting 16 so as to deprive the parison of its heat. The parison 16 is thus cooled down preliminarily before it enters the netting 16 and the air consumed to cool the parison 16 is then heated and discharged to the open air in the directions of arrows as illustrated in FIG. 2.

The parison 11 which is fully expanded and inflated within the netting 16 is drawn downwardly away from the lower peripheral edge 16b of the netting 16 to be elongated in an axial direction and, as it passes through the lower edge 16b, the parison or now a tubular film 11a is cooled and set with cooling air supplied from an annular air supply tubing 19 which is positioned below the netting 16 in a manner to surround the tubular film 11a at a substantial spacing therefrom.

The pressurized air to be supplied from the air vent 10c serves not only to maintain the internal pressure in the expanding parison but to impart a mechanical stress to the expanding parison to help the micelles in the parison be oriented correctly.

The film 11a, which has been biaxially oriented and set in this manner is then rolled on a taking-up roller (not shown) through a pair of pinching rollers 20 and 20' at a constant rate.

It will be now appreciated that the expansion of the parison 11 is restricted by the inner wall of the netting 16 so that the parison 11 is prevented from being expanded into an irregular shape which would result in irregular thickness and flatness of the resultant film. Moreover, the parison 11 is uniformly forced against the inner wall surface of the netting 16 as it is expanded with constant and uniform pressure, the resultant film has an even and regular thickness. Also, even though a local difference in temperature is present in the parison extruded, such difference will be cancelled as the parison is cooled preliminarily with air supplied from the air supply tubing 12 and successively with air from the air vent 10c at the center of the annular discharge nozzle 10b.

Figure 4:
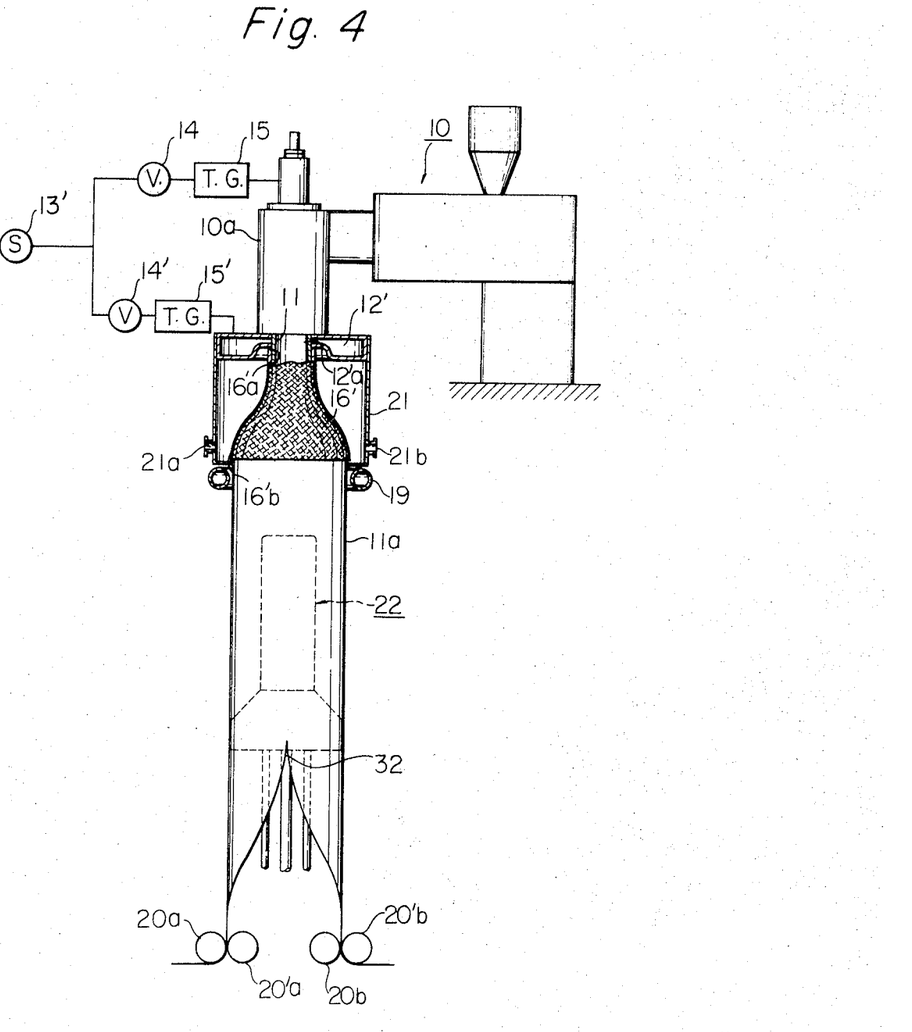
FIG. 4 is similar to FIG. 1 but shows another preferred example of the apparatus.
Figure 5:
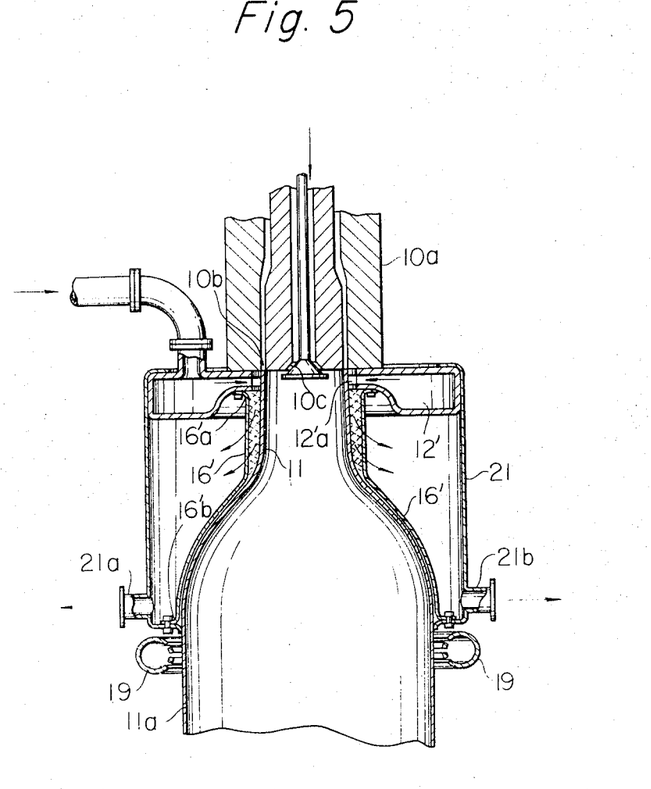
FIG. 5 is also similar to FIG. 2 but shows the apparatus shown in FIG. 4.

Now, a modified form of the apparatus adapted to carry out the method according to the present invention is illustrated in FIGS. 4 and 5. The apparatus as shown is essentially similarly constructed to the apparatus described with reference to FIGS. 1 and 2 except that a cooling device is provided in the path of the tubular film depending from the lower edge of the netting and, as such, like reference numerals are assigned to corresponding elements and parts in FIGS. 1 and 2.

Referring to FIG. 4, the apparatus carrying out the method according to the invention is also used in combination with a usual extruder machine 10 having an extrusion head 10a with an annular discharge nozzle 10b. A semifused thermoplastic material or parison 11 is continuously extruded in a tubular form through the discharge nozzle 10b. As soon as the parison 11 is extruded, it is cooled down with steam supplied from the outlet 12'a of a steam supply tubing 12' which communicates with a source 13' of pressurized hot steam through a pressure control valve 14 and temperature gauge 15. The temperature of the steam thus applied to the outer peripheral wall of the parison 11 leaving the discharge nozzle 10b is regulated by the temperature gauge 15 in a manner to maintain the parison 11 at a temperature ranging from the softening point to the melting point of the thermoplastic material of the parison, as in the case where air is utilized to preliminarily cool the parison 11.

The parison 11 preliminarily cooled is then introduced into an enclosure 16' which is positioned below the discharge nozzle 10b. The porous enclosure 16' is shaped generally like an inverted funnel similarly to the netting 16 shown in FIG. 3 and is made of suitable porous unwoven cloth as previously discussed. The parison 11 passed into the porous enclosure 16' is therein expanded with hot pressurized steam blown thereinto through a steam vent 10c' debouching at the center of the annular discharge nozzle 10b in the extrusion head 10a. The steam supplied through the steam vent 10c' is delivered from the source 13' through a pressure control valve 14' and temperature gauge 15'.

The porous enclosure 16' is herein shown to be enclosed by a metallic casing 21 with exhaust ports 21a and 21b opened to the open air. The steam supplied through the outlet 12'a of the steam supply tubing 12' to cool down the parison is passed into this casing 21, where the steam has its pressure and temperature reduced due to adiabatic expansion and is allowed out of the exhaust ports 21a and 21b to the atmosphere.

The porous enclosure 16' is secured in position with its upper peripheral edge 16'a mounted on a link 17 fixed to the steam supply tubing 12' and its lower peripheral edge 16'b connected with the lower edge of the casing 21, as shown.

As the parison 11 expanded into a tubular film 11a is simultaneously drawn downwardly away from the lower peripheral edge 16'b to be elongated in an axial direction and, as it passes through the lower edge 16b, the film 11a is cooled and set with cooling air (or water) supplied from an annular air (or water) supply tubing 19, which surrounds the tubular film 11a immediately below the casing 21.

Figure 6:
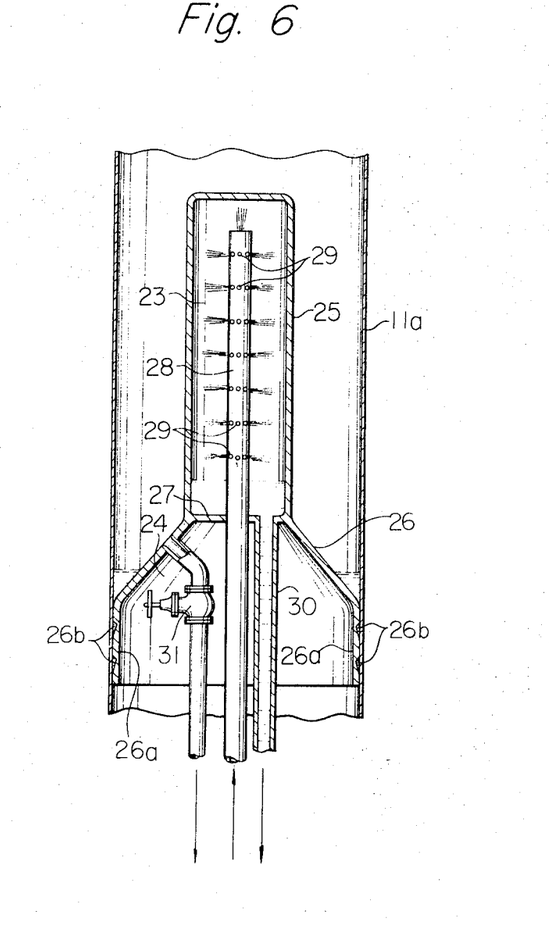
FIG. 6 is a vertical sectional view showing, on an enlarged scale, a preferred example of a cooling device used in the apparatus shown in FIG. 4.

The steam which has gushed into the parison 11 from the steam vent 10c' deprives the parison of its heat to keep it at an optimum temperature optimum for proper elongation of the parison and the pressure and temperature of the steam thus used are rapidly decreased due to adiabatic expansion thereof. The steam is then further cooled down by a cooling device which is provided within the path of the tubular film 11a as illustrated in FIG. 6.

The cooling device, which is generally designated as 22 in FIG. 4, has upper and lower chambers 23 and 24, respectively. The upper chamber 23 is defined by a hollow cylindrical column 25 with its top end closed while the lower chamber 24 is defined by a generally frustoconical hollow body 26 with a vertical sidewall 26a. The two chambers 23 and 24 are separated from each other by a partition wall 27. The column 25 is positioned below and in alignment with the porous enclosure 16' and the outside diameter of the sidewall 26a of the frustoconical hollow body 26 is identical with the inside diameter of the lower peripheral edge 16'b of the porous enclosure 16'. A cooling tube 28 with a plurality of fine apertures 29 formed in its peripheral wall extends through the partition wall 27 towards the closed top end of the column 25, whereby cool water is discharged into the upper chamber 23 through these apertures 29. The apertures 29 may be preferably disposed at different levels in the cooling tube 28 so as to provide increased cooling effect. The water deposited in the upper chamber 23 is drained off through a drain pipe 30 leading from the bottom of the column 25. If preferred, a pressure control valve 31 may be provided to adjust the pressure in the tubular film 11a.

The tubular film 11a which is being moved continuously along the column 25 is thereby cooled down with the cool water ejected through the apertures 29 in the cooling tube 28. The cool water ejected from the apertures 29 also serves to cool down the hot steam staying in the parison 11 and tubular film 11a so that the steam is converted into condensed water which deposits between the outer surface of the frustoconical wall of the hollow body 26 and inner surface of the tubular film 11a. Such deposit of cool water serves to seal off the substantial spacing between the tubular film 11a and vertical sidewall 26a of the hollow body 26 and acts as a "lubricant" which smooths the movement of the tubular film 11a against the sidewall 26a. In order to seal the spacing between the tubular film 11a and side wall 26a, the sidewall may be provided on its outer periphery with a suitable number of steps 26b as illustrated in FIG. 6.

By controlling the amount of water to be ejected through the apertures 29 in the cooling tube 28, the amount of condensed water and accordingly the internal pressure in the parison 11 can be controlled.

The tubular film 11a cooled and set by the thus constructed cooling device 22 is severed into two halves by a knife or knives 32 and the two halves are rolled on taking up rollers (not shown) through pinching rollers 20a and 20'a and 20b and 20'b, as shown in FIG. 4.

The outstanding advantages of the method according to the invention over prior art methods will be more clearly understood from the following Examples.

EXAMPLE 1

A semifused tubular parison of a graft copolymer of polystyrene with 100 mm. outside diameter and 0.5 mm. wall thickness was extruded continuously from an annular discharge nozzle of an extruder machine at a temperature of 195° C. and at an extrusion rate of 50 kg./hour in a usual manner. The melt index of the parison in compliance with d–1238 of the standards of American Society for Testing Materials (ASTM) was 0.3 g./10 min. As soon as the parison thus extruded left the discharge nozzle, air under a static pressure of 10 mm./water-column was blown to the outer peripheral wall of the parison to preliminarily cool it down to about 165° C. The parison was then introduced into a funnel-shaped netting with its lower peripheral edge enlarged to 400 mm. inside diameter. The netting was made of glass fibers which were braided with 16 mesh. Air under a static pressure of 20 mm./water-column was ejected into the parison depending from the discharge nozzle to have the parison fully expanded within the netting. The parison, as it was being expanded toward the inner wall surface of the netting, was found to have been cooled down to about 150° C. and, as it passed through the lower peripheral edge of the netting to terminate its expansion, to about 140° C. The resultant tubular film thus discharged from the netting was elongated 400 percent in its peripheral direction as compared with the initial diameter of the extruded parison.

The tubular film was then cooled and set with atmospheric air at a normal temperature blown to the outer peripheral wall surface thereof, during which time the internal pressure in the tubular film was maintained at a static pressure of 20 mm./water-column. The film thus biaxially oriented and set was rolled in a usual manner on a taking-up roller through pinching rollers.

The film produced in this manner was a transparent film of polystyrene with uniform thickness and flatness. The thickness of the film as measured was 30 microns and the tensile strength was 730 kg./cm.$^2$ in the longitudinal and lateral directions. This tensile strength is 133 percent greater than 548 kg./cm.$^2$ of a nonoriented film usually manufactured.

EXAMPLE 2

A semifused tubular parison of low-density polyethylene with 100 mm. outside diameter and 0.5 mm. wall thickness was extruded from an annular discharge nozzle of an extruder machine at a temperature of 145° C. and at an extrusion rate of 50 kg./hour in a usual manner. The melt index of the parison in compliance with Japanese Industrial Standard 6760–1960 was 12 g./10 min. and the vicat softening point in compliance with ASTM D–1525–58T was 94° C. Immediately after the tubular parison was extruded from the discharge nozzle, air under a static pressure of 10 mm./water-column was blown to the outer peripheral wall of the parison to preliminarily cool it down to about 120° C. The parison was then introduced into a funnel-shaped porous enclosure with its lower peripheral edge enlarged to 400 mm. inside diameter. The porous enclosure was made of hemp yarns braided with 40 mesh. Air under a static pressure of 20 mm./water-column was ejected into the parison depending from the discharge nozzle to have the parison fully expanded within the funnel-shaped enclosure. The parison, as it was being expanded toward the inner wall surface of the enclosure, was found to have been cooled down to about 110° C. and, as it passed through the lower peripheral edge of the netting to terminate its expansion, to about 95° C. The resultant tubular film thus discharged from the porous enclosure was elongated 400 percent in its peripheral direction as compared with the initial outside diameter of the extruded parison.

The tubular film was then cooled and set with atmospheric air blown to the outer peripheral wall with its internal pressure maintained at 20 mm./water-column and was rolled in a manner similar to Example 1.

The film produced in this manner was a transparent film of polyethylene with uniform thickness and flatness. The thickness of the film as measured was 30 microns and the tensile strength was 245 kg./m.$^2$ in the longitudinal and lateral directions. This tensile strength is 133 percent greater than 180 kg./cm.$^2$ of a nonoriented film.

EXAMPLE 3

A semifused tubular parison of polyethylene mixed with 10 percent vinyl acetate with 100 mm. outside diameter and 0.5 mm. wall thickness was extruded from an annular discharge nozzle of an extruder machine at a temperature of 130° C. and at an extrusion rate of 50 kg./hour in a usual manner. Immediately after the parison was extruded from the discharge nozzle, air under a static pressure of 10 mm./water-column was blown to the outer peripheral wall of the parison to preliminarily cool it down to a temperature of about 110° C. The parison was then introduced into a funnel-shaped porous enclosure with its lower peripheral edge enlarged to 400 mm. inside diameter. The netting was made of cotton yarns braided with 40 mesh. Air under a static pressure of 20 mm./water-column was ejected into the parison depending from the discharge nozzle to have the parison fully expanded within the enclosure. The parison, as it was being expanded toward the inner wall surface of the porous enclosure, was found to have been cooled down to about 95° C. and, as it passed through the lower peripheral edge of the porous enclosure to terminate its expansion, to about 78° C. The resultant tubular film discharged from the porous enclosure was elongated 400 percent in its peripheral direction as compared with the outside diameter of the extruded parison.

The tubular film was then cooled and set with air at a normal temperature blown to the outer peripheral wall surface thereof with its internal pressure maintained at 20 mm./water-column and was afterwards rolled on a taking-up roller in a manner similar to Example 1.

The film produced in this manner was a transparent film with uniform thickness and flatness. The thickness of the film as measured was 25 microns and the tensile strength was 268 kg./cm.$^2$ in the longitudinal and lateral directions which is 134 percent greater than 200 kg./cm.$^2$ tensile strength of a nonoriented film usually manufactured.

Example 4

A semifused tubular parison of a graft copolymer polystyrene with 100 mm. outside diameter and 2.5 mm. wall thickness was extruded from an annular discharge nozzle of an extruder machine at a temperature of 195° C. and at an extrusion rate of 50 kg./hour in a usual manner. The melt index in compliance with ASTM D–1238 was 0.3 g./10 min. As soon as the tubular parison was extruded from the discharge nozzle, steam pressurized under a static pressure of 2,000 mm./water-column and heated at a temperature of 160° C. was blown to the outer peripheral wall surface of the parison at a rate of 30 kg./hour to preliminarily cool it down to about 165° C. The steam prevailing around the parison thus preliminarily cooled was found to have a temperature of about 100° C. The parison thus extruded was then introduced into a funnel-shaped netting with its lower peripheral edge enlarged to 400 mm. inside diameter. The netting was made of glass fibers braided with 16 mesh. Into the parison depending from the discharge nozzle was ejected steam pressurized under a static pressure of 2,000 mm./water-column and heated up to 160° C. at a rate of 70 kg./hour so as to have the parison fully expanded within the funnel-shaped netting. The parison, as it was being expanded toward the inner wall surface of the netting, was found to have been cooled to about 150° C. and, as it passed through the lower peripheral edge of the netting to terminate its expansion, to about 140° C.

The resultant tubular film was then further cooled with air blown to the outer peripheral wall thereof so that the film was finally set.

The steam staying in the tubular film thus cooled down tends to have its internal pressure and temperature decreased due to adiabatic expansion of the steam. The pressure in the tubular film was therefore maintained at 500 mm./water-column by controlling the temperature and pressure therein by means of a cooling device positioned in the tubular film, whereby the parison in the netting was properly expanded with a regulated pressure and a proper stress was imparted to the expanding film. The condensed water produced as a result of the reduction in the temperature of the steam in the tubular film was utilized to seal off the substantial spacing between the structural wall of the cooling device and the inner surface of the tubular film.

The tubular film produced in this manner was then severed into two halves by a plurality of knives positioned below the cooling device and the two halves were rolled on taking-up rollers in a manner similar to Example 1.

The film thus obtained was a transparent film of polystyrene with uniform thickness and flatness. The thickness of the film was 200 microns and the tensile strength was 730 kg./cm.$^2$ in the axial and peripheral directions. This tensile strength is 133 percent greater than that of a usual nonoriented film.

EXAMPLE 5

A semifused tubular parison of low-density polyethylene with 100 mm. outside diameter and 2.5 mm. wall thickness was extruded from an annular discharge nozzle of an extruder machine in a usual manner at a temperature of 165° C. and at an extrusion rate of 50 kg./hour. The melt index of the parison thus extruded was 12 g./10 min. in compliance with JIS 6760–1960 and the vicat softening point was 94° C. in compliance with ASTM D–1525–58T. As soon as the parison was extruded from the discharge nozzle, steam pressurized under a static pressure of 200 mm./water-column and heated to a temperature of 100° C. was blown to the outer peripheral wall of the parison at a rate of 40 kg./hour, whereby the parison was preliminarily cooled down to about 120° C.

The parison was then introduced into a funnel-shaped porous enclosure with its lower edge enlarged to 400 mm. inside diameter. The porous enclosure was made of hemp yarns braided with 20 mesh. Then, steam pressurized under a static pressure of 200 mm./water-column and heated at 100° C. was ejected into the parison depending from the discharge nozzle at a rate of 60 kg./hour so as to have the parison fully expanded within the porous enclosure. The parison, as it was being expanded toward the inner surface of the porous enclosure, was found to have been cooled down to about 110° C. and, as it passed through the lower peripheral edge of the enclosure to terminate its expansion, to about 95° C. The resultant tubular film was further cooled and finally set with its internal pressure maintained at 200 mm./water-column and was then severed into two halves. The halves were then rolled on taking-up rollers.

The film produced in this manner was a transparent film of low-density polyethylene with uniform thickness and flatness. The thickness of the film was 200 microns and the tensile strength was 245 kg./cm.$^2$ in the longitudinal and lateral directions. This tensile strength was 136 percent against 180 kg./cm.$^2$ of a film elongated 200 percent.

EXAMPLE 6

A semifused tubular parison of polyethylene mixed with 5 percent vinyl acetate with 100 mm. outside diameter and 2.5 mm. wall thickness was extruded from an annular discharge nozzle of an extruder machine in a usual manner at a temperature of 160° C. and at an extrusion rate of 50 kg./hour. Steam pressurized under a static pressure of 200 mm./water-column was blown to the outer peripheral wall of the parison at a rate of 40 kg./hour, whereby the parison was preliminarily cooled down to a temperature of about 115° C.

The parison thus extruded was then introduced into a funnel-shaped porous enclosure with its lower peripheral edge enlarged to 400 mm. inside diameter. The porous enclosure was made of cotton yarns which were braided with 20 mesh. Steam under a static pressure of 200 mm./water-column and heated at 100° C. was blown into the parison thus depending from the discharge nozzle at a rate of 60 kg./hour. The parison, as it was being expanded toward the inner wall surface of the porous enclosure, was found to have cooled down to about 105° C. and, as it passed through the lower peripheral edge of the porous enclosure to terminate its expansion, to about 93° C.

The resultant tubular film was then cooled and finally set with its internal pressure maintained at 150 mm./water-column and was severed into two halves, which were afterwards rolled on taking-up rollers.

The film produced in this manner was a transparent film with uniform thickness and flatness. The thickness of the film was 250 microns and the tensile strength was 257 kg./cm.$^2$ in the longitudinal and lateral directions. This tensile strength is 140 percent against 185 kg./cm.$^2$ of a film which is 200 percent elongated.

Now, it will be understood from the foregoing description and illustrations annexed thereto that the method, and apparatus proposed as preferred to carry out the method, according to the invention can be modified in numerous manners and ways without departing from the spirit and scope of the invention which should be defined from the appended claims.

What is claimed is:

1. Apparatus for manufacturing a biaxially oriented film from a semifused thermoplastic material which is extruded in a hollow tubular form from the annular discharge nozzle of an extruder machine of usual construction, which apparatus comprises an air-permeable heat-resistive enclosure with open ends and positioned immediately below and at a substantial spacing from said annular discharge nozzle, said enclosure being shaped generally like an inverted funnel with its upper peripheral edge sized in an inside diameter substantially corresponding to the outside diameter of the tubular semifused thermoplastic material and its lower peripheral edge sized in an inside diameter substantially corresponding to the outside diameter of the tubular material to be finally expanded, a vent opened at the substantial center of said discharge nozzle toward said enclosure to eject pressurized fluid into said tubular material thereby to have said tubular material fully expanded within said enclosure into a tubular film with an outside diameter corresponding to the inside diameter of said lower peripheral edge of said enclosure, a cooling tubing positioned below said enclosure and surrounding the tubular film depending from said enclosure, and means for drawing said tubular film downwardly away from said enclosure.

2. Apparatus according to claim 1, wherein said vent communicates with a source of hot pressurized air.

3. Apparatus according to claim 2, wherein a pressure control valve and temperature gauge are provided between said vent and said source.

4. Apparatus according to claim 1, wherein said vent communicates with a source of pressurized steam.

5. Apparatus according to claim 4, wherein a pressure control valve and temperature gauge are provided between said vent and said source of steam.

6. Apparatus according to claim 1, further comprising a cooling fluid supply tubing with annular outlet surrounding the tubular material depending from said discharge nozzle.

7. Apparatus according to claim 6, wherein said tubing communicates with a source of hot pressurized air through a pressure control valve and temperature gauge.

8. Apparatus according to claim 6, wherein said tubing communicates with a source of pressurized steam through a pressure control valve and temperature gauge.

9. Apparatus according to claim 1, wherein said air-permeable heat-resistive enclosure is in 5 to 100 mesh.

10. Apparatus according to claim 9, wherein said enclosure is made of a netting with said mesh.

11. Apparatus according to claim 9, wherein said enclosure is made of porous unwoven cloth with said mesh.

12. Apparatus according to claim 11, wherein said cloth is made of any of glass fiber, rock wool, hemp yarn and cotton yarn.

* * * * *